US010972341B2

(12) United States Patent
Mudigonda (10) Patent No.: US 10,972,341 B2
(45) Date of Patent: *Apr. 6, 2021

(54) SUBNET STRETCHING VIA LAYER THREE COMMUNICATIONS

(71) Applicant: Microsoft Technology Licensing, LLC, Redmond, WA (US)

(72) Inventor: Uma Mahesh Mudigonda, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/290,534

(22) Filed: Mar. 1, 2019

(65) Prior Publication Data

US 2019/0199587 A1 Jun. 27, 2019

Related U.S. Application Data

(63) Continuation of application No. 15/258,491, filed on Sep. 7, 2016, now Pat. No. 10,263,840.

(30) Foreign Application Priority Data

May 24, 2016 (IN) .............................. 201641017781

(51) Int. Cl.
*H04L 12/24* (2006.01)
*H04L 29/12* (2006.01)
(Continued)

(52) U.S. Cl.
CPC ............ *H04L 41/0806* (2013.01); *G06F 9/46* (2013.01); *H04L 12/4633* (2013.01);
(Continued)

(58) Field of Classification Search
CPC .......... H04L 29/12915; H04L 61/2592; H04L 45/04; H04L 45/16; H04L 49/25
See application file for complete search history.

(56) References Cited

U.S. PATENT DOCUMENTS

2006/0133413 A1* 6/2006 Bousis .............. H04L 29/12358
370/466
2007/0280274 A1* 12/2007 Haraguchi .............. H04L 45/00
370/401
(Continued)

FOREIGN PATENT DOCUMENTS

| CN | 104205757 A | 12/2014 |
|---|---|---|
| CN | 105391771 A | 3/2016 |

(Continued)

OTHER PUBLICATIONS

"First Office Action and Search Report Issued in Chinese Patent Application No. 201780031689.6", dated Jan. 6, 2021, 6 Pages.

*Primary Examiner* — Barbara B Anyan (57) ABSTRACT

Systems and methods for stretching a subnet that do not require level 2 (L2) communications to be handled are provided. A user may gradually migrate VMs or applications instead of migrating an entire subnet at one time, may fail-over specific VMs without failing-over an entire subnet or renumbering IP addresses, may deploy applications to the cloud without the need to create a VPN, or may enable hybrid network connectivity without modifying routes or (re)configuring edge routers, among other benefits. The domains over which the subnet are stretched include a virtual gateway which is associated with the layer-3 (L3) addresses of the other domains. L3 communications within the domain are routed within that domain, and L3 communications within the subnet in another domain are intercepted by the local gateway, are passed to the remote (Continued)

gateway of the other domain, and are forwarded to the destination while leveraging L3 communications.

20 Claims, 7 Drawing Sheets

(51) Int. Cl.
| | |
|---|---|
| *H04L 12/46* | (2006.01) |
| *H04L 29/08* | (2006.01) |
| *G06F 9/46* | (2006.01) |
| *G06F 9/455* | (2018.01) |
| *H04L 12/715* | (2013.01) |
| *H04L 12/947* | (2013.01) |
| *H04L 12/761* | (2013.01) |

(52) U.S. Cl.
CPC ...... *H04L 12/4641* (2013.01); *H04L 41/0813* (2013.01); *H04L 61/2007* (2013.01); *H04L 61/2084* (2013.01); *H04L 61/6068* (2013.01); *H04L 67/34* (2013.01); *G06F 2009/45595* (2013.01); *H04L 29/12028* (2013.01); *H04L 29/12358* (2013.01); *H04L 29/12915* (2013.01); *H04L 45/04* (2013.01); *H04L 45/16* (2013.01); *H04L 49/25* (2013.01); *H04L 61/1511* (2013.01); *H04L 61/2592* (2013.01)

(56) References Cited

U.S. PATENT DOCUMENTS

2008/0240105 A1* 10/2008 Abdallah ............ H04W 40/246
370/392
2009/0046686 A1* 2/2009 Izaki ...................... H04W 8/20
370/338

FOREIGN PATENT DOCUMENTS

| CN | 105519080 A | 4/2016 |
|---|---|---|
| WO | 2015197136 A1 | 12/2015 |

\* cited by examiner

SUBNET STRETCHING VIA LAYER THREE COMMUNICATIONS

CROSS-REFERENCE TO RELATED APPLICATIONS

This patent application is a continuation of U.S. patent application Ser. No. 15/258,491, filed Sep. 7, 2016, entitled "Subnet Stretching via Layer Three Communications", and now U.S. Pat. No. 10,263,840, which claims foreign priority to India Patent Application 201641017781, filed May 24, 2016, the disclosures of which are expressly incorporated herein, in their entirety, by reference.

BACKGROUND

Cloud computing provides users (also referred to as "tenants") with services, such as software as a service (SaaS), platform as a service (PaaS), and infrastructure as a service (IaaS), that are hosted in distributed computing environments (i.e., a cloud). Tenants may deploy their applications in various traditional data centers or in cloud networks, including, but not limited to: on-premises private clouds, hosted private clouds, service provider clouds, and public clouds. Tenants may also deploy their applications across multiple clouds for various reasons, including, but not limited to: reducing the risk of downtime, as an emergency backup, or part of a planned transfer from one cloud to another (e.g., for performance gains or cost savings).

When a given application or machine is originally deployed in a given network, it often needs to be reconfigured when moved to a new network so that communications with the application or machine continue to function properly or the infrastructure on which it is deployed (including infrastructure-linked systems and applications) needs to be reconfigured. For example, a user may wish to leverage the network of a cloud service provider, and deploy or move the virtual machines providing the applications to the chosen cloud network from an existing network. The step of reconfiguring the applications or infrastructure to function with the new cloud network requires computing resources to be expended, and can result in the application being unavailable for a changeover period while users and linked systems learn of the new location of the application.

There are multiple methods in which an application or infrastructure is reconfigured to enable communication with remotely linked systems in the network, including: creating separate networks/subnets in an existing local network or cloud, or in a new local network or cloud; and stretching an existing subnet across new and existing local networks and clouds. Currently, users who employ technologies to "stretch" their subnet across multiple distributed computing environments will typically use a layer-2 (L2) gateway, or change the subnet mask and use a layer-3 (L3) hub for all communications, or will reconfigure the applications to account for the different locations to which the subnet is stretched. As will be appreciated, L2 communications require greater overhead than L3 communications, which can cause issues (including latency and broadcast storms) with respect to how communications are handled, and, as a result, not all clouds use L2 communications. As will also be appreciated, L3 hubs (with subnet mask of/32) increase the number of steps a communication must pass through, as a central handler must process the communications and may introduce errors into the communications, and require that IP settings (e.g., subnet mask, default router configuration) be reconfigured in the network infrastructure and/or the machines running on the network.

SUMMARY

This summary is provided to introduce a selection of concepts in a simplified form that are further described below in the Detailed Description section. This summary is not intended to identify all features of the claimed subject matter, nor is it intended as limiting the scope of the claimed subject matter.

Systems and methods are provided herein for enabling a subnet to be stretched between two or more networking environments. The present disclosure allows for layer-3 (L3) communications to be used exclusively in stretching the subnet, as opposed to using layer-2 (L2) communications or a mixture of L2 and L3 communications. By using L3 communications exclusively, tenant (overlay) networks can be stretched across overlay networks that only provide L2 restricted communications and also avoid the additional overhead and processing associated with L2 communications (if allowed by the service provider). By using the present disclosure, the tenant (overlay) networks avoid the need to reconfigure hosted applications, reconfigure overlay networks, or use a hub-and-spoke communications model for all communications. The present disclosure thereby increases the efficiency of the distributed computing environments by reducing the downtime and complexity associated with configuration and the number of hops that data takes to be routed within the subnet, the processing resources needed to manage the subnet, and the user interactions needed to control migrations, among other benefits.

The details of one or more aspects are set forth in the accompanying drawings and description below. Other features and advantages will be apparent from a reading of the following detailed description and a review of the associated drawings. It is to be understood that the following detailed description is explanatory only and is not restrictive; the proper scope of the present disclosure is set by the claims.

BRIEF DESCRIPTION OF THE DRAWINGS

The accompanying drawings, which are incorporated in and constitute a part of this disclosure, illustrate various aspects of the present disclosure. In the drawings.

DETAILED DESCRIPTION

The following detailed description refers to the accompanying drawings. Wherever possible, the same reference numbers are used in the drawings and the following description to refer to the same or similar elements. While aspects of the present disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the present disclosure, but instead, the proper scope of the present disclosure is defined by the appended claims. Examples may take the form of a hardware implementation, or an entirely software implementation, or an implementation combining software and hardware aspects. The following detailed description is, therefore, not to be taken in a limiting sense.

As will be appreciated by one of ordinary skill in the art, the Open Systems Interconnection (OSI) model describes seven layers of communication in a computing system. The third layer (L3) is described as the Network Layer, and uses packets to send information, which may be formatted according to various protocols, including the Internet Protocol (e.g., IPv4 or IPv6). A packet will include, among other fields, a source address field, a destination address field, and a payload, which includes the data to be transferred from the source to the destination. The second layer (L2) is described as the Data Link Layer, and uses frames to transfer data between adjacent nodes in a network. Infrastructure as a Service (IaaS) providers, for example, facilitate and encourage tenants to bring in their own local network by providing the overlay over the service provider's cloud network. Many distributed computing environments, such as IaaS networks, do not allow their tenants to use L2 communications to save on processing resources, particularly to avoid the complexities related to broadcast domains, as allowing the use of L2 frames would require additional overhead compared to using L3 packets. One of the challenges in only allowing the use of L3 communications or disallowing the use of L2 communications for tenants is that the functionality traditionally provided by the usage of L2 packets cannot be provided to the tenants. One such functionality is the stretching of a subnet across IaaS provider networks and other networks. Since many IaaS providers do not allow tenant L2 packets, one has to use alternate means to implement L2-functuonality when stretching a subnet across distributed computing environments when one or more of those environments do not use L2 communications (e.g., are restricted from using L2 communications or use L2-free communications).

Additionally, allowing communication across the subnet to be L2-free does not prevent one or more of the networks comprising the subnet from using L2 communications in other networks internally. For example, an IT datacenter may use a typical networking arrangement, which includes L2 traffic. If the administrators of that datacenter extend their subnet to a cloud-based network (which typically restricts the use of L2 traffic), that datacenter may continue to use L2 communications internally and the cloud-based machines will continue to operate internally via L3 communications. Communications from one network in the subnet to another are handled by gateways existing within the networks that will forward those communications to a receiving gateway to handle according to its network's communications settings. Thus, an existing subnet may be seamlessly stretched so that machines local to any given network will act as though the remote machines are also locally deployed.

When users set up a subnet (a subnetwork), the hardware devices and virtual machines that are part of that subnet are given IP addresses that share a portion in common, which is referred to as a network prefix, and a unique portion, which is referred to as the host identifier. For example, all the components of an IPv4 subnet may have IP address of 192.168.1.xxx, where the network prefix is "192.168.1" in the example, and the host identifier, which is unique for each component, is represented as "xxx" in the example. The size of the network prefix may be indicated with a slash character followed by a number indicating the size, in bits, of the prefix. Using the above example, "192.168.1.xxx/24" would be the proper annotation to indicate that the twenty-four most significant bits of the address are the network prefix. The subnet mask for the example network prefix would be "255.255.255.0", and will yield the network prefix via a bitwise AND comparison to an IP address (stripping out the last 8 bits).

IP addresses referenced in the present disclosure will be discussed in a dot-decimal format which one of ordinary skill in the art will understand to be a base ten representation of the value of a fixed number of bits delineated by full stop characters. For example, an IPv4 address may be represented as the decimal conversion of four octets (i.e., four eight-bit bytes), separated by "." characters. Although aspects and examples are primarily discussed in relation to IPv4 addresses with a twenty-four bit network prefix, one of ordinary skill in the art will appreciate the applicability of the present disclosure to IPv6 and other addressing schemes and with network prefixes of different lengths (e.g., 1 to 29 bits for an IPv4 address). The aspects and examples that are given do not limit the scope of the present application but serve to illustrate possibilities to the reader. As will be appreciated by those of ordinary skill in the art, although most of the descriptions in this disclosure refer to VMs and virtual networks, the aspects are applicable to other networking applications, including, but not limited to: Physical machines, containers, uni-kernels, applications, threads, agents, switches, routers, kubernetes, etc.

Figure 1A:
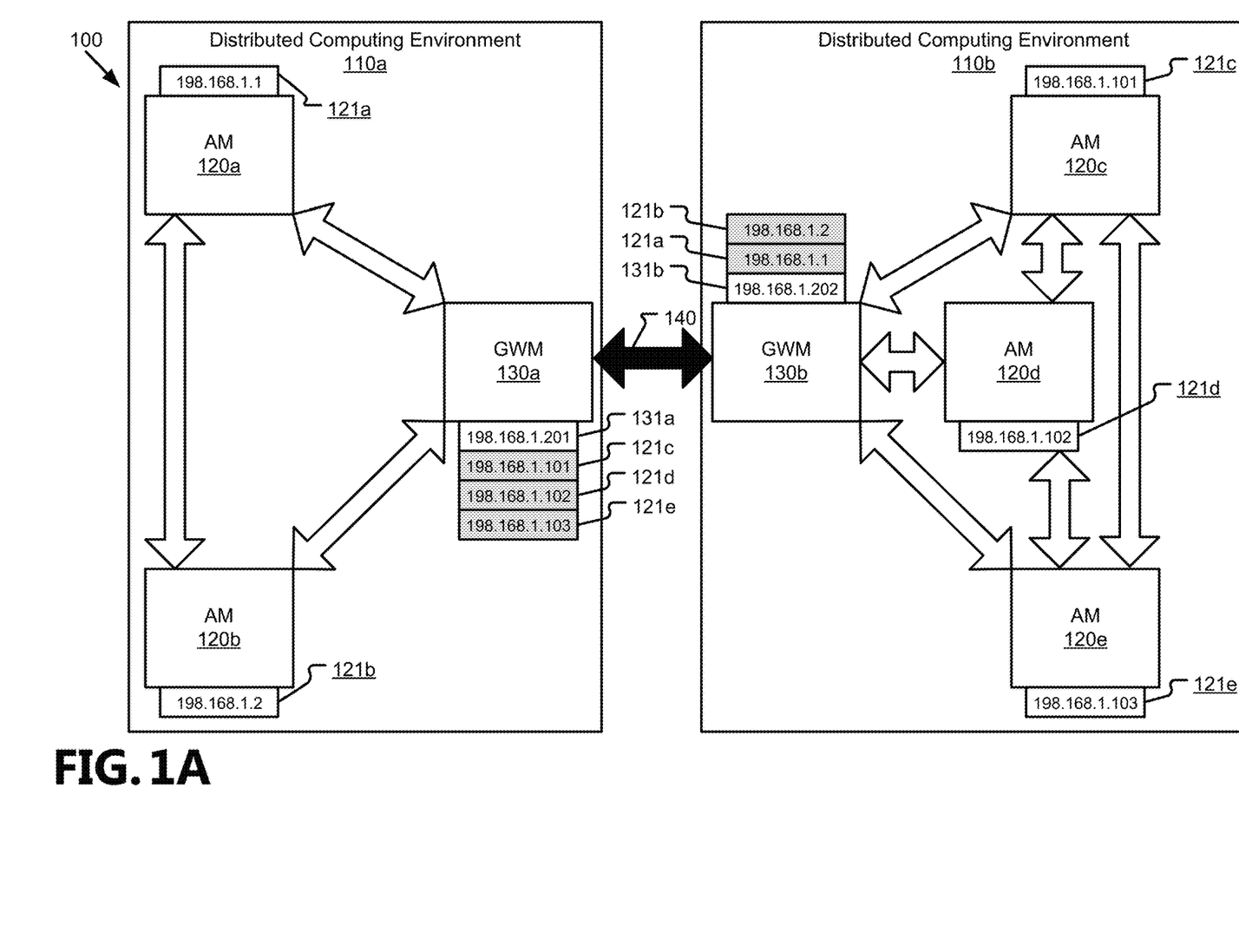
FIG. 1A illustrates an example subnet that has been stretched across multiple networks.

FIG. 1A illustrates an example subnet 100 that has been stretched across multiple networks, which are illustrated as distributed computing environments (DCE) 110. As illustrated, the first DCE 110*a* and the second DCE 110*b* each include several machines and devices, which for the purposes of the present disclosure are divided into two classes for discussion: application machines (AM) 120 used to provide the services of the example subnet 100 to users (also referred to as "tenants") and gateway machines (GWM) 130 used to stretch the example subnet 100 via a tunnel 140 according to the present disclosure. One of ordinary skill in the art will recognize that additional elements (e.g., routers, network monitors, inactive machines) may be added to or are already part of the DCE 110, but have not been illustrated for purposes of clarity in discussing the present disclosure.

The AM 120 and the GWM 130 include both physical machines and virtual machines (VM) running on physical machines. For purposes of clarity and brevity, the term "VM" is to be understood to encompass all containers for the services, applications, or processes provided to the tenant. Although discussed herein primarily in terms of distributed computing environments and VMs, one of ordinary skill in the art will understand that examples given in relation to DCE 110 and VMs may be applied to other types of computing environments and with physical devices and machines. For example, one or more networks referred to as DCE 110 may be local networks. Similarly, although several examples are given in regard to the AM 120 and GWM 130 being VMs, the VMs in those examples may be replaced with physical computing devices, including host machines, gateways, network switches, servers, personal computing devices, etc., to enable subnet stretching via L3 communications across a variety of computing environments. For example, the functionality of the GWM 130 may be realized in a virtual network switch, a physical network switch, an agent in another VM, a Network Interface Card (NIC) driver, a NIC firmware, combinations thereof (e.g., NIC firmware and NIC driver together), etc. It will also be understood that examples using physical devices may have those devices replaced with VMs without deviating from the scope of the present disclosure.

VMs are run as instances on host machines which are physical computing devices within the DCE 110. A given host machine may provide several VMs which may be part of the same subnet or of different subnets. For example, the host machine that provides first AM 120a may also provide second AM 120b and the first GWM 130a as VMs but may also provide VMs that are not part of the illustrated example subnet 100 that belong to a different subnet. In another example, different host machines in the first DCE 110a may run each of the first AM 120a, second AM 120b, and the first GWM 130a. A hypervisor or host machine operating system manages the provision of the VMs to the tenants of the DCE 110 and how the computing resources are devoted to any given VM running on the host machine. In various aspects, the GWM 130 may be run as instances on host machines that are in communication with a physical gateway for the DCE 110 or may be run as part of the physical gateways, network switches, routers, etc. that are used by the DCE 110 to accept and route packets. Examples of hardware components that comprise a computing device, such as a host machine, are discussed in greater detail in regard to FIG. 4.

As will be appreciated, although two DCE 110 are illustrated, the present disclosure is applicable to subnets that are stretched across three or more DCE 110. Similarly, the components provided in any given DCE 110 may be more or fewer than what are illustrated in FIG. 1A. Individual GWMs 130 will be referred to based on the DCE 110 in which they reside (e.g., first GWM 130a belongs to first DCE 110a and second GWM 130b belongs to second DCE 110b), and a given DCE 110 may include more than one GWM 130 (e.g., a primary first GWM 130a and a secondary first GWM 130a). When a DCE 110 includes more than one GWM 130, it may balance the loads between the GWM 130 according to various load distribution schemes and may provide additional GWMs 130 to ensure high availability for throughput by distributing which IP addresses are associated with a given GWM 130 among those provided in a single DCE 110.

DCE 110 provide tenants with access to a shared infrastructure of host machines according to several service models, including, but not limited to: Software as a Service (SaaS), where both software and hardware are provided; Platform as a Service (PaaS), where hardware and Operating Systems (OS) are provided for the tenant to run its application software on; or Infrastructure as a Service (IaaS), where the hardware is provided for the tenant to run its OS and application software on. In various aspects, hardware provided to tenants includes, but is not limited to: host machines, servers, storage networks, switches, routers, cabling, etc. DCE 110 include on-premises private clouds, hosted private clouds, service provider clouds, and public clouds. Examples of clouds include AZURE® (provided by Microsoft Corp., of Redmond, Wash.) and AMAZON WEB SERVICES™ (AWS) (provided by Amazon.com Inc., of Seattle, Wash.).

In various aspects, when the subnet 100 is stretched to encompass more than one DCE 110, all of the machines in those DCE 110 that will be part of the subnet 100 will share a network prefix and subnet mask (that is, each IP address assigned will have the same network prefix and will be interpretable with the same subnet mask). For example, if a company were to stretch its on-premises network from the first DCE 110a to a second DCE 110b provided by a cloud computing service provider, the machines may each have an IP address assigned to be "192.168.1.xxx". Each machine is assigned a unique IP address for addressing that machine. For example, first AM 120a may be assigned the example IP address "192.168.1.1" 121a, second AM 120b "192.168.1.2" 122b, third AM 120c "192.168.1.101" 121c, fourth AM 120d "192.168.1.102" 121d, fifth AM 120e "192.168.1.103" 121e, first GWM 130a "192.168.1.201" 131a, and second GWM 130b "192.168.1.202" 131b (collectively, example AM IP addresses 121 and GWM IP addresses 131).

The association of the IP addresses of the AMs 120 to the GWM 130 is realized by configuring the respective IP addresses in the network configurations of the service provider. As a result, the network provider will send all traffic (both originating within its network and received from external networks) that is destined for remote AMs 120 to the local GWM 130 to forward to the remote portion of the subnet 100. One of ordinary skill in the art will appreciate that there are multiple mechanisms by which the AM IP addresses 121 may be associated with a GWM 130, including but not limited to invoking APIs (Application Program Interfaces), setting the configuration in a portal UI (User Interface) to associate AM IP address 121 to GWMs 130 (although the AM IP addresses 121 need not be actually configured on the GWV 130), GWMs 130 calling necessary APIs for associating AM IP addresses 121, and requesting AM IP addresses 121 on GWMs 130 and NICs by leveraging appropriate discovery protocols, such as, for example, BOOTP (Bootstrap Protocol) or DHCP (Dynamic Host Configuration Protocol).

Each of the GWM 130 will be associated with the AM IP addresses 121 of the AMs 120 belonging to the opposing DCE 110. Continuing the above example, the first GWM 130a, as part of the first DCE 110a, has been and assigned a GWM IP address 131a and is associated with the IP addresses (121c, 121d, 121e) assigned to third AM 120c, fourth AM 120d, and fifth AM 120e to have four addressable IP addresses (shown as example IP addresses of "192.168.1.201", "192.168.1.101", "192.168.1.102", and "192.168.1.103"). Similarly, the second GWM 130b, as part of the second DCE 110b, has been assigned a GWM IP address 131b and is associated with the IP addresses (121a, 121b) of first AM 120a and second AM 120b of the first DCE 110a to have three addressable IP addresses (shown as example IP addresses of "192.168.1.202", "192.168.1.1", and "192.168.1.2"). In various aspects, a GWM 130 may also be associated with the GWM IP addresses 131 of the GWM 130 in other DCE 110 of the subnet 100.

By associating the GWM 130 with the IP addresses of machines from outside of its DCE 110, IP packets that are sent to the machines exterior to a given DCE 110 (but part of the subnet 100) are received within the DCE 110 by the GWM 130, and are transmitted to the GWM 130 of the destination's DCE 110 for forwarding to the destination machine. This allows for machines within a given DCE 110 to communicate via L3 packets with other machines within the given DCE 110 and with the machines outside of the given DCE 110 but part of the subnet 100 without relying on L2 communications. For example, if first AM 120*a* sends a message to second AM 120*b* (a local machine), the IP packet will include the IP address of first AM 120*a* (121*a*) in a source address field, the IP address of second AM 120*b* (121*b*) in the destination address field, and the message will be routed within the first DCE 110*a* to the second AM 120*b* without needing to be handled by the first GWM 130*a*.

In another example, when the first AM 120*a* sends an L3 communication to the third AM 130*c* (a remote machine), because the IP address assigned to the third AM 130*c* (131*a*) is associated with the first GWM 130*a*, it will be routed within the first DCE 110*a* to the first GWM 130*a*. The first GWM 130*a* will encapsulate the L3 communication according to the tunneling protocol used, and will transmit the tunneled L3 communication to the second GWM 130*b*. For example, the original IP packet from first AM 120*a* to third AM 120*c* may be encapsulated in a tunneled IP packet as a payload field with the unique IP address of the first GWM 130*a* (131*a*) in the source address field and the unique IP address of the second GWM 130*b* (131*b*) in the destination address field. The second GWM 130*b* will decapsulate the tunneled L3 communication and forward the original L3 communication to the third AM 120*c*. The communication received by the third AM 120*c* will indicate the source as the first AM 120*c* and the destination as the third AM 120*c*. The encapsulation and decapsulation happen at the gateways so that the packets, when they leave AM 120*a* or AM 120*c* or when they arrive at AM 120*a* or AM 120*c* in the above example will be plain IP packets without any tunneling or encapsulation.

In various aspects, the L3 packets may be tunneled over https-based (Hypertext Transfer Protocol-Secure) tunnels 140, such as SSTP (Secure Socket Tunneling Protocol) tunnels, for the traversal of firewalls present in the DCE 110 over which the subnet 100 is stretched. In other aspects, Network Address Translation (NAT) or other methods can be used instead of tunneling protocols to create the tunnel 140 and ensure that packets reach their respective destinations. In additional aspects, a local (to the user's on-premises DCE 110) GWM 130 may be deployed with one or more NICs, either virtual or physical, wherein at least one NIC is connected to the remote DCE 110, and wherein NICs provide connectivity to the remote DCE 110 via a VPN tunnel to allow the local GWM 130 to reach the remote GWM 130 internally to the subnet 100, which is discussed in greater detail in regard to FIG. 1C. Examples of VPN tunnels include the use of an IPsec (Internet Protocol Security) or an MPLS (Multiprotocol Label Switching) VPN. VPN tunnels may be initiated by the user (e.g., from a client running on an AM 120) without needing to deploy an additional router or communication device via a point-to-site (P2S) VPN.

Each GWM 130 will know the GWM IP addresses 131 of the other GWMs 130 in the subnet 100, and the same GWM 130 may facilitate stretching the subnet to multiple DCEs 110. The IP addresses within a remote DCE 110 may be determined via a discovery protocol, such as, for example, DHCP, a DHCP relay agent, BOOTP, and locater/id separation protocol (LISP), or by examining Address Resolution Protocol (ARP) requests and responses, or by a routing protocol, like BGP (Border Gateway Protocol). Alternatively, the IP addresses may be set during the initialization of a subnet stretch. In various aspects, when two DCE 110 comprise a subnet 100, a given GWM 130 will know that messages received from within its DCE 110 that are addressed with an IP address associated with the GWM 130 for a remote machine will be destined for the other GWM 130. When more than two DCE 110 comprise a subnet 100, such as when a tenant is transferring services gradually (e.g., to failover one VM instead of all VMs in a DCE 110) from one remote network/cloud to another while maintaining an on-premises DCE 110, the GWM 130 may retain a list of which IP addresses are associated with each remote GWM 130. Additionally, when a given DCE 110 includes more than one GWM 130, the GWM 130 may retain a list correlating the IP addresses of remote machines with the specific GWM 130 configured to handle/balance their traffic. Alternatively, a GWM 130 may broadcast an L3 message to all other GWM 130 in the subnet 100 and the GWM 130 associated with the IP address of the destination will forward the L3 message and the GWM 130 not associated with the IP address will drop the message. As practitioners of the art will appreciate, communication between GWMs 130 may leverage existing L3 and L2 protocols to keep the list of IP addresses associated with each GWM 130 up to date and accurate. The GWMs 130 will also implement existing L2 and L3 protocols or their proxies to ensure that AMs 120 can be serviced with the necessary L2 or L3 functionality. Examples of these functionalities include, but are not limited to: Address resolution protocol, broadcast/multicast protocols, locator/id separation protocol (LISP), transparent Ethernet bridging protocols, discovery protocols, assignment protocols, proxy protocols, etc.

In some aspects, when a machine that is provided by a DCE 110 has a preexisting IP address that does not share the network prefix and is added to the subnet 100, its IP address may also be associated with the GWM 130 of that DCE 110. For example, if a VM that was set up prior to the subnet stretching has a hardcoded IP address, by associating the IP address of the VM with the GWM 130, the other VMs and physical machines of the subnet 100 will be able to communicate via the GWM 130 with the VM having the different address.

The GWM 130 are also operable, in some aspects, to perform NAT operations so that remote targets, such as remote AMs 120, may be addressed by mnemonics other than their numeric IP addresses within the DCE 110 and subnet 100. For example, a shared service available on host123.fabrikam.com (wherein "fabrikam" is the Fully Qualified Domain Name (FQDN) of the service provider) may be registered by a GWM 130 as host123.contoso.com (wherein "contoso.com" is the FQDN of the tenant) and having a given IP address (e.g., "198.168.1.254") so that machines in the subnet 100 can address messages to host123 (as a flat name or as host123.contoso.com, rather than the public name of host123.fabrikam.com or the public IP address) or as the full name, and the GWM 130 can additionally resolve the full name or flat name to the IP address. The address and name may be advertised within the subnet 100 by a host through a local name registration service which may be managed by the GWM 130 or a separate machine. For example, an internal Domain Name System (DNS) may be provided as a service of the GWM 130 or may be provided from a separate machine to manage a routing table and match numerical addresses to their mnemonics. In implementations where one of the networks comprising the subnet 100 allows the use of L2 communications internally, the address and name may be advertised within those portions of the subnet 100 using Layer 2 communications. In some implementations, the address and name may be identical to an address and name assigned to the remote AM 120.

Figure 1B:
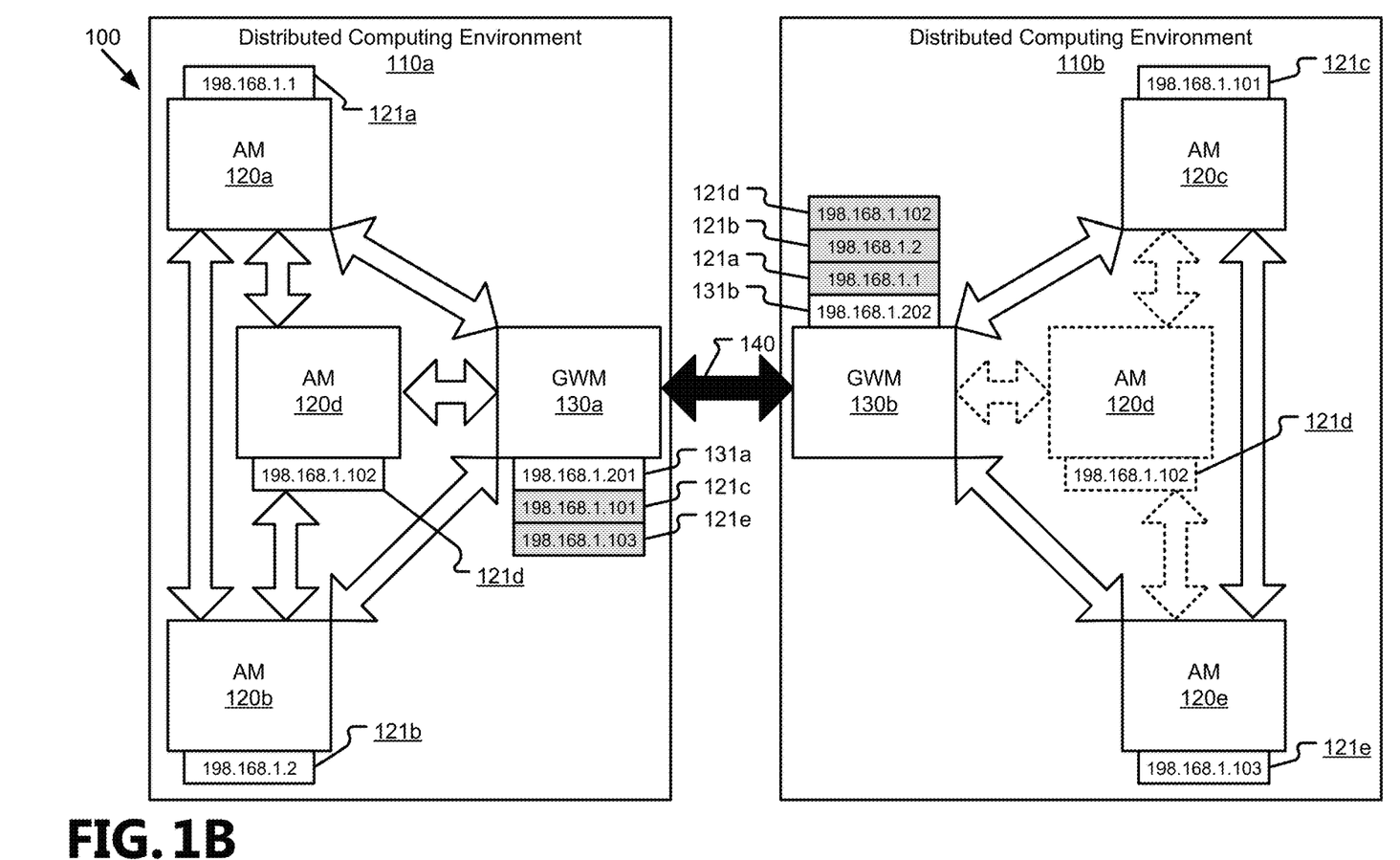
FIG. 1B illustrates the example subnet of FIG. 1A in which a machine has been transferred between the distributed computing environments.
Figure 1C:
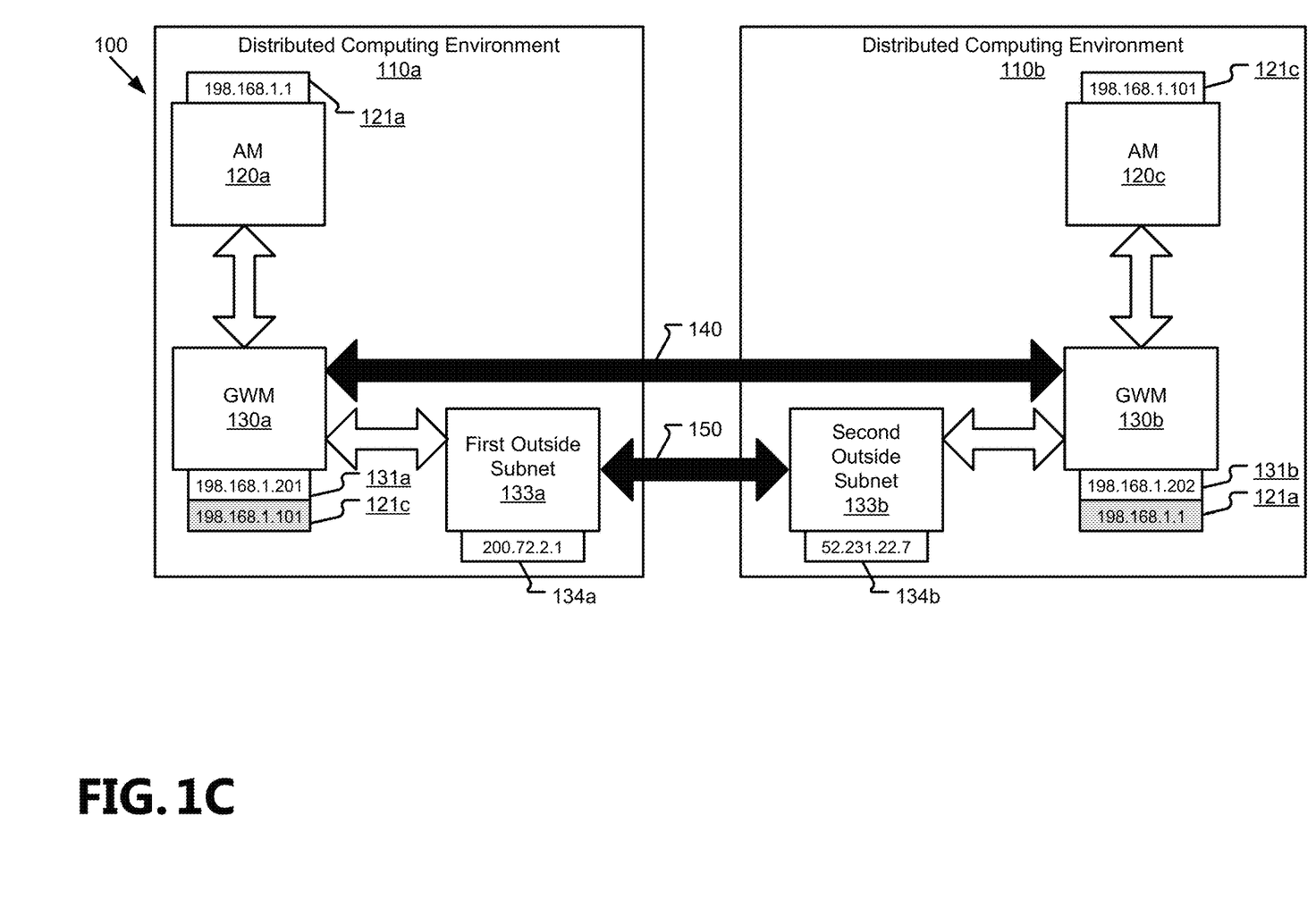
FIG. 1C illustrates the example subnet of FIG. 1A in which the gateway machines are routable through multiple interfaces directly between gateway machines and outside subnets.
Figure 1D:
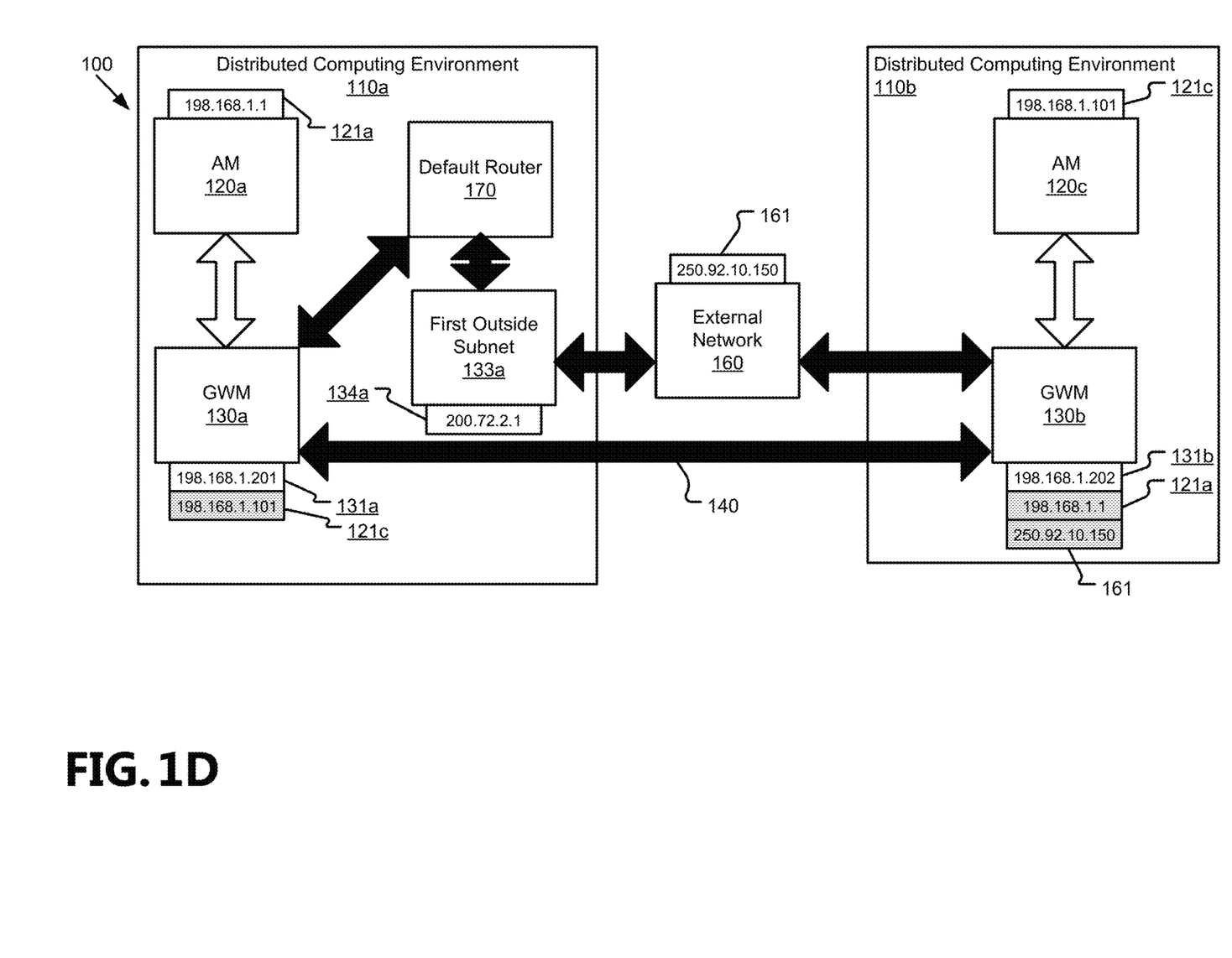
FIG. 1D illustrates the example subnet of FIG. 1A in which a gateway machine is addressable from an external network.

In other aspects, the GWM 130 are reachable directly from the Internet or other external network, as illustrated and discussed in greater detail in regard to FIG. 1D, and may be addressed directly by its GWM IP address 131, a lookup name for the GWM 130, or a root name or address for the subnet 100 or DCE 110. The GWM 130 may then forward messages to local or remote machines. For example, when messages are received from outside of the subnet 100 (e.g., in response to a call to or from an external website), the messages may be received by an initial gateway or router which is internal to a given DCE 110, and which will forward the message to the appropriate machine within the DCE 110 based on the destination IP address. If the appropriate machine within the given DCE 110 is the GWM 110 (due to being associated with the AM IP address 121 for the remote AM 120 that is the actual destination), the GWM 130 will encapsulate and transmit the message to other DCE 110 comprising the subnet 100 for the remote machine to receive the message.

FIG. 1B illustrates the example subnet 100 of FIG. 1A in which a machine has been transferred between the DCE 110. A machine may be transferred in response to a fail-over condition, a network migration, or load balancing requirements between the DCE 110 comprising a stretched subnet 100. As illustrated, the fourth AM 120d has been transferred from the second DCE 110b to the first DCE 110a as indicated by the fourth AM 120d being shown with solid lines in first DCE 110a and with dashed lines in second DCE 110b.

When an AM 120 is transferred from one DCE 110 to another, it retains its assigned IP address and continues to use the same subnet mask. The GWM 130 for the DCE 110 for which the AM 120 was previously provided adds an association of the AM IP address 121 assigned to the transferred AM 120, and the GWM 130 for the DCE that the AM 120 is transferred to removes the association with the AM IP address 121 for the transferred AM 120. For example, fourth AM 120d may be assigned an AM IP address 121d of "192.128.1.102", and first GWM 130a will remove an association with that AM IP address 121d, and second GWM 130b will add an association for that AM IP address 121d when fourth AM 120d is transferred. An AM 120 may be transferred by reinitiating a VM in a different network (e.g., as part of a migration, a failover, etc.) or physically moving a physical device from one network location to another. In aspects where more than two DCE 110 are used, the GWM 130 for non-source and non-destination DCE 110 (also referred to as unaffected DCE 110 and unaffected GWM 130) may update a mapping for which GWM 130 is to be addressed to reach the transferred machine.

By allowing a machine to retain its IP address when transferred to a new DCE 110, the applications that are part of that machine or are part of other machines that use/reference that machine do not need to be reconfigured. Communications between machines within the new DCE 110 may be directly addressed within the DCE 110, and communications from now-remote machines can be properly routed using L3 communications without need for L2 communications. This allows for transfers of subsets of machines from one network to another, so that, for example, when one VM reaches a fail-over condition and is migrated from an original DCE 110 to a different DCE 110, the other VMs run on the original DCE 110 may remain on the original DCE 110 and do not need to be reconfigured.

FIG. 1C illustrates the example subnet 100 of FIG. 1A in which the GWM 130 are routable through multiple interfaces directly between GWM 130 and outside subnets 133. The connective functionalities of the GWM 130 are provided by at least two interfaces, such as physical or virtual NIC, to form a first tunnel 140 and a second tunnel 150. As illustrated, although the first tunnel 140 is illustrated above the outside subnets 133, the link between the GWM 130 flows through the outside subnets 133 once established. The plurality of AM 120 illustrated previously within each DCE 110 have been consolidated into a single AM 130 for each DCE 110 for purposes of clarity in illustrating and explaining communications via multiple interfaces.

The example subnet 100 depicted in FIG. 1C may depict an integration of a second DCE 110b with a first DCE 110a comprising the infrastructure to which an enterprise already has access wherein the first DCE 110a and the second DCE 110b are located remotely from one another. In various aspects, either or both of the illustrated DCE 110 may be spread across several sites (e.g., multiple data centers on an enterprise's campus, at separate offices of an enterprise or between enterprise data center and hosted or public clouds).

In the illustrated example, the DCE 110 are connected to each other by a second tunnel 150 established between first outside subnet 133a and second outside subnet 133b. Although illustrated as part of the first and second DCE 110, in various aspects, the one or more of the outside subnets 133 may be external to DCE 110. The first GWM 130a will use one of its at least two interfaces to connect to the first outside subnet 133a without stretching the subnet 100 to include the first outside subnet 133a. Similarly, the second GWM 130b will use one of its at least two interfaces to connect to the second outside subnet 133b without stretching the subnet 100 to include the first outside subnet 133b. The two outside subnets 133 will then establish the second tunnel between their two subnets. In various aspects, the second tunnel 150 may be an S2S VPN or an MPLS VPN.

Because the outside subnets 133 do not share the configuration settings of the stretched subnet 100, the IP addresses used by the second tunnel 150 will use IP addresses that do not have the same network prefixes as the machines of the subnet 100, which the at least two NIC of the GWM 130 will account for. For example, each GWM 130 may have two NICs, where a first NIC for each GWM 130 is set up according to the shared parameters of the subnet 100, and acts as transfer for the first tunnel 140 between the DCE 110, and a second NIC for each gateway is set up according to different parameters, and acts to connect to the outside subnet 133. As illustrated, the first interface IP address 134a, assigned to the first outside subnet 133a, is "200.72.2.1" and the second interface IP address 134b, assigned to the second outside subnet 133b, is "52.231.22.7", which do not need to share a network prefix with each other or the subnet 100.

The second tunnel 150 establishes a communication channel between the outside subnets 133 to link the DCEs 110 and allow communication between the AM 120 provided therein. In various aspects, the outside subnets 133 expose their respective secondary interface IP addresses 134 publically for use and discovery by external networks. Additionally, the outside subnets 133 are operable to communicate via L2 communications, and to translate between L2 and L3 communications to enable the DCE 110 to connect with networks that allow/do not allow L2 communications when the given DCE 110 does not/does allow L2 communications. For example, the outside subnets 133 may act as proxies for the GWM 130 to implement one or more L2 discovery, assignment, proxy, or broadcast/multicast protocols and to convert to and from L2 and L3 communications, such as, for example: ARP, BGP, a DHCP agent, NAT, LISP, etc.

L3 communications between the AM 120 will use the AM IP addresses 121 as their endpoints regardless of whether using the first tunnel 140 or the second tunnel 150, but the encapsulation used on those communications may differ in various aspects according to the protocols used to establish the communication channels represented by the tunnels.

FIG. 1D illustrates the example subnet 100 of FIG. 1A in which a GWM 130 is addressable from an external network 160. As illustrated, the DCE 110 comprising the subnet 100 are linked via an external network 160 addressable via an external IP address 161 in addition to or instead of the tunnel 140. The first gateway 130a connects via the default router 170 of the first DCE 110a to a first outside subnet 133a, which established a communication channel through the external network to the second GWM 130b, this stretching the subnet 100. Although illustrated below the path described above, the tunnel 140 is formed through the path described above so that the GWM 130a may use a single interface, such as a physical or virtual NIC, thus reducing the hardware and/or setup requirements for forming and maintaining the tunnel 140. The plurality of AM 120 illustrated previously within each DCE 110 have been consolidated into a single AM 130 for each DCE 110 for purposes of clarity in illustrating and explaining communications via an external network 160.

In some aspects, the external network 160 is the Internet, a network remote from the DCE 110 of the GWM 130 that is not part of the subnet 100, a network hosted by the same DCE 110 of the GWM 130 that is not part of the subnet 100 (e.g., from another tenant of the DCE 110), or a network to which the subnet 100 will be stretched. In various aspects, packets routed to or through the external network 160 may be transmitted as L2-free communications, and may be encapsulated, encrypted, or otherwise modified for transmission via the external network 160.

In FIG. 1D, a machine in the external network 160 has been assigned an external IP address 161 of "250.92.10.150" as an example. Although illustrated with one external IP address 161 assigned in the external network 160, one of ordinary skill in the art will appreciate that the external network 160 may include machines using many different IP addresses and that the external IP address 161 may provide access to a subnet with several more IP addresses that are not public.

The default router 170 is, in various aspects, provided by the tenant or the service provider if the DCE 110 is provided on a cloud network. In various aspects, the default router 170 may be a physical or a virtual device that serves as an access point between networks to which communications will default when the IP address in a message does not match any other routes within a routing table. The default router 170 allows the GWM 130a to have a single interface, so that the AM 120a may dial out of the DCE 110a in which it is provided, so that messages sent from the AM 120a will be sent from the single interface, and transmitted by the default router 170 over the external network 160 to the destination GWM 130b, which will forward the message to the destination AM 120c, to seamlessly stretch the subnet 100.

In various aspects, the one or more external IP addresses 161 may be associated with none, one, or more GWM 130 or interfaces thereof in one or more DCE 110 of the subnet 100. For example, if third AM 120c is communicating with a party hosted in the external network 160, the external IP address 161 may be associated with the second GWM 130b so that the second GWM 130b can properly route the third AM's 130c communications directly to the external network 160. In another example, the subnet 100 may hide at least some of its addresses from the external network 160 and expose one or more IP addresses publically and route traffic to or from the external network 160 through the exposed addresses. As illustrated, the first outside subnet 133a is assigned the interface address 134a, which is exposed to the external network 160. The first outside subnet 133a is also associated with the external IP address 161 within the first DCE 110 so that traffic to/from the first AM 120a will be seen by the external network 160 as originating from the interface address 134a. Although illustrated as passing through the default router 170 and first outside subnet 133a, in the communications between the AM 120 may be addressed directly to each other for transmission via the external network 160.

The external IP address 161 is associated with the GWM 130 (or an interface thereof) local to the AM 120 that is communicating with the external network 160 so that IP addresses internal to the subnet 100 may remain hidden from the external network 160 but communications remain routable externally via the external network 160. In various aspects, the AM IP addresses 121 are directly accessible to the external network 160 or are only accessible through the GWM 130 of the DCE 110 to the external network 160. When the AM IP addresses 121 are directly accessible, traffic from the GWM 130 may be "NATed" to translate an endpoint address to or from a mnemonic or numeric address so that return traffic from the GWM 130 will be sent to the public IP address 161. NAT operations may allow to the use of port mapping at the receiving GWM 130 to translate the IP addresses for packets received by the GWM 130 to or from the AM 120 that is in communication with the external network 160 to different addresses as required for proper routing. This allows the GWM 160 to use a single interface to connect with remote portions of the stretched subnet 100, which reduces deployment costs for the subnet 100, in both reducing the amount of hardware that needs to be accessible by a given GWM 130 and by reducing the need to configure that hardware.

In some aspects, the external network 160 may be a potential network onto which the subnet 100 will be stretched. Each of the GWM 130 may maintain their current associations with remote AM IP addresses 121 and IP addresses publically available from the external network 160 will be associated with at least one GWM 130. By associating these IP addresses with a GWM 130, the machines may retain their current configuration settings and will be inter-routable throughout the stretched subnet 100 via L3 communications without need for L2 communications, thus reducing the overhead for data transmission, improving the operability of machines to address one another in the subnet 100 as it changes, and reducing the computing resources needed to manage the subnet 100. In various aspects, the tunnel 140 may be a site-to-site (S2S) VPN or an MPLS VPN or an HTTPs based tunnel or network address translated connection.

Figure 2:
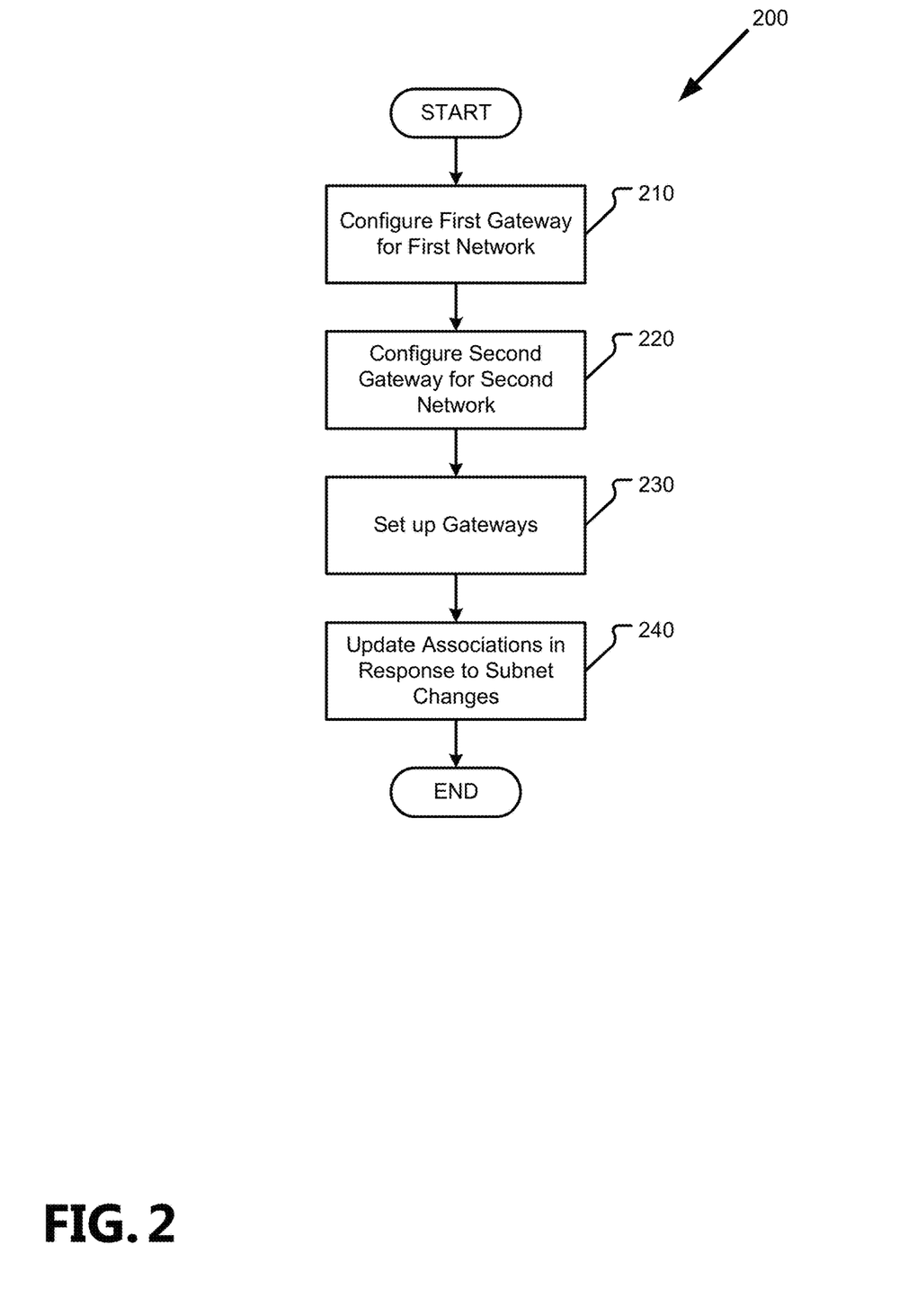
FIG. 2 is a flowchart showing general stages involved in an example method for stretching a subnet using L3 packets.

FIG. 2 is a flowchart showing general stages involved in an example method 200 for stretching a subnet using L3 packets. By applying method 200, a tenant may gradually migrate machines or applications instead of migrating an entire subnet at one time, may fail-over specific VMs without failing-over an entire subnet or renumbering IP addresses, may deploy applications to the cloud without the need to create an S2S VPN, or may enable hybrid network connectivity without modifying routes or (re)configuring edge routers, among other benefits as described above in greater detail in regard to FIGS. 1A-D.

Method 200 begins at OPERATION 210, where a first gateway for a first network is created or configured, and proceeds to OPERATION 220, where a second gateway is created or configured for a second network. For purposes of clarity, examples will be discussed in regard to the first network stretching to the second network, which may be a cloud network, but it will be understood that the designators for a given network are interchangeable in practice.

Proceeding to OPERATION 230, the gateways are set up according to a set of IP configuration settings shared by the networks, and their IP addresses will share network prefixes and use the same subnet mask as other machines within the stretched subnet. The shared IP configuration settings may be the existing settings of the network from which stretching is originated (including keeping an NIC and other machines configured to use DHCP) or may be newly-created settings. When a NIC, or other machine that is part of the DCE 110, is configured to use DHCP to dynamically assign IP addresses to machines, any and all of the available settings may be set for sharing within the subnet 100. Each gateway will be assigned a unique IP address and will be associated in its network with the IP addresses of machines hosted in the other network. For example, when each network uses one gateway and hosts three VMs, each gateway will be addressable in its hosting network by four IP addresses with its own GWM IP address and the VM IP addresses being from the other network. By configuring the gateways to be associated with the IP addresses of machines hosted in the other network in addition to a unique IP address, the subnet may be stretched to include an overlay network or a similar virtual or physical network where it is not possible to proxy ARP responses (referred to collectively as L2 restricted networks or L2-free networks). Instead, L3 communications will be sent to that network's gateway based on the gateway being associated with the remote machine's IP address in the given network and will be routed to the gateway of the other network for the other gateway to forward to the destination machine. A gateway for a network that uses L2 traffic internally will send and receive L2-free communications to the other gateways, but may handle and address communications to, from, or within its associated network (such as ARP responses) as L2 communications so that the subnet stretching will be invisible to the machines of that network. In other aspects the gateways on either side will participate in all L2 and L3 communications required for the network as well as proxy requests and response as required.

In various aspects, the IP addresses are assigned to machines and associated with the gateways as static IP addresses by calling an appropriate API in the first network or requesting the IP address via discovery protocols, such as DHCP or BOOTP. When a discovery protocol is used, a discovery relay agent (such as a DHCP relay agent) may periodically renew leases for IP addresses at a remote location (e.g., the second network from the first network). The identities of IP addresses used in one network may be transferred to the other networks to which the subnet is stretched via/32 routes (in either direction) via protocols such as BGP. A routing table used by the gateway will be updated as machines are moved, added, or removed from the DCEs 110.

Once the gateways are set up, they may be updated at OPERATION 240 in response to a new machine being deployed, a machine being removed, a machine being added to the subnet 100, a machine being transferred to a different network within the subnet 100, a new gateway being created, a gateway being removed, or other changes to the subnet 100. As will be appreciated, the subnet 100 may use a name service, such as an internal DNS, to allow machines or tenants to specify targets for communication via a mnemonic instead of or in addition to a numeric IP address. In various aspects, the name service is a separate machine provided within the DCE 110 or may be provided as a service by the gateway. The name service need not be updated as when updating the network configurations but may be updated when machines are added to, removed from, or moved within the subnet 100.

When a new machine or instance is created or added to the subnet 100, it is assigned an IP address according to the subnet's parameters, and the gateways hosted in remote portions of the subnet 100 (e.g., a gateway of a remote DCE 110) will be associated with that IP address in their portions of the subnet 100 so that the new machine is reachable via L3 communications from machines hosted at different sites comprising the subnet 100. When a machine is removed (e.g., an instance is terminated, a device shuts down), its IP address may be unassociated from the remote gateways. Similarly, when a machine's hosting environment is changed (i.e., it is transferred from one network to another), it will retain its IP address, the gateway for the new host will unassociated the machine's IP address, and the gateway for the previous host will be associated with that IP address.

When additional gateways are created in a given network, for example, to provide greater availability to the remote portions of the subnet 100 or to balance loads, the IP addresses for remote machines will be unassociated from one or more existing gateways and will be associated with the new gateway. Similarly, when the number of gateways in a given network are consolidated (e.g., a gateway is terminated), the IP addresses associated with the terminated gateway will be associated with a different gateway in the network. As will be appreciated, the configuration of any routing tables held by the gateways of other networks in the stretched subnet may be updated as a given network expands or consolidates the number of gateways it uses.

Method 200 may remain at OPERATION 240 to monitor for further changes to the subnet 100 and make subsequent updates to the settings, or method 200 may conclude.

Figure 3:
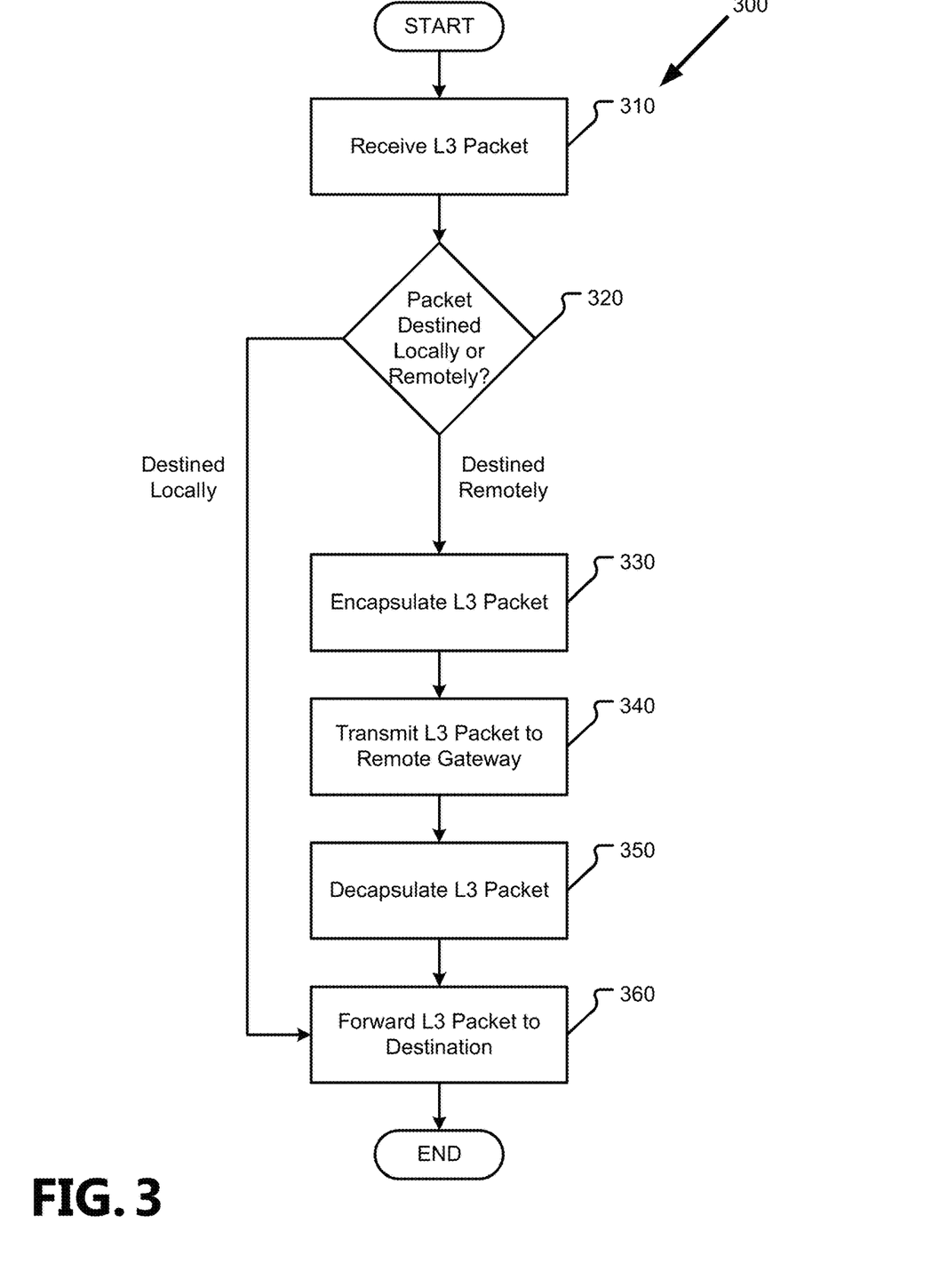
FIG. 3 is a flowchart showing general stages involved in an example method for communicating via L3 packets across the distributed computing environments of a stretched subnet.

FIG. 3 is a flowchart showing general stages involved in an example method 200 for communicating via L3 packets across the DCEs 110 of a stretched subnet 100. In contrast to the method 300, communications between machines within a single DCE 110 are routed between those machines according to the structure of the DCE 110 and do not need to be handled by a GWM 130 but may be routed directly to one another.

Method 300 begins at OPERATION 310 when an L3 packet (such as an IP packet) is received by the GWM 130 of a DCE 110. Because the GWM 130 is associated with the IP addresses of machines hosted in the other DCE 110 of the subnet 100, the GWM 130 will receive L3 packets from machines within its DCE 110 that are addressed to the remote machines that are part of the subnet 100 but hosted in a different DCE 110. In various aspects, the GWM 130 may also receive packets addressed to the GWM 130 or from remote sources to the machines local to the GWM 130.

Method 300 proceeds to DECISION 320 where it is determined whether the packet is destined locally and should therefore be consumed by the GWM 130 or should be forwarded to a local machine, or should be transmitted via one or more tunnels 140 to a remote portion of the subnet or an external network 160. The GWM 130 read the L3 packet and will determine, based on the IP address in the destination field of the packet (or a looked-up IP address based on a mnemonic in the IP destination field) whether the packet's destination address matches any of the tunnels 140 that will take the packet to one or more remote DCE 110.

When there is a match for a route, the packet is determined to be destined remotely and the GWM 130 will determine which tunnel 140 hosted by the GWM 130 is to be used to transmit the packet to a remote GWM 130. In various aspects, the GWM 130 will consult a routing table and/or DNS to determine which tunnel 140 (if any) matches the route for the L3 packet. When it is determined that the packet is addressed to a machine hosted remotely within the subnet 100 to which the GWM 130 has access, method 300 proceeds to OPERATION 330.

When there is not a match for a route, the GWM 130 will read the packet to determine whether a tunnel 140 needs to be established, whether a different GWM 130 part of the DCE 110 (e.g., a secondary GWM 130) already has a tunnel 140 established, or whether the packet is addressed to a local machine. If a tunnel 140 is to be established, it is determined that the message is destined remotely, and method 300 proceeds to OPERATION 330. If the packet was received by the GWM 130 for a different GWM 130 within the same DCE 110 or a local machine, that packet is determined to be destined locally, and method 300 will proceed to OPERATION 360 where the packet may be forwarded to the default router of the GWM 130 which may forward the packed to an AM 120 or GWM 130 locally. In a special case, if the GWM 130 that received the packet is also the destination, the packet will be forwarded internally for use by the GWM 130.

At OPERATION 330, the L3 packet is encapsulated by the local GWM 130 for transmission to a remote GWM 130 serving the DCE 110 that hosts the destination specified in the L3 packet. In various aspects, the local GWM 130 consults a look-up table to determine the IP address of the remote GWM 130 serving the target destination. For example, a given DCE 110 may use more than one GWM 130 (e.g., a primary GWM 130 and a secondary GWM 130) to balance the loads experienced by the individual GWM 130 and expand processing availability, and the local GWM 130 will need to determine which remote GWM 130 to which to transmit the encapsulated packet. In another example, the subnet 100 may be stretched across three or more DCE 110, and the local GWM 130 will need to determine which DCE 110 hosts the target destination.

As part of encapsulation, the L3 packet may be encrypted, placed into the payload of a packet used in a tunnel between the local GWM 130 and the remote GWM 130, and may be broken into pieces (and sent via multiple tunneling packets). Various methods for encapsulation may be used in different aspects, and once the L3 packet is encapsulated, method 300 proceeds to OPERATION 340, where the packet is transmitted to the remote GWM 130.

When the remote GWM 130 receives the L3 packet, method 300 proceeds to OPERATION 350 where the L3 packet is decapsulated from the tunneled packet. In various aspects, depending on the method used to encapsulate the L3 packet, error detection/correction, decryption, and reassembly (when the L3 packet was broken across multiple tunneling packets) procedures may be applied. The remote GWM 130 may determine whether it is the GWM 130 of the destination DCE 110 by consulting a lookup table for the IP addresses hosted within the associated DCE 110. If it is determined that the DCE 110 served by the GWM 130 hosts the IP address of the target destination, method 300 proceeds to OPERATION 360. If, however, it is determined that the DCE 110 served by the GWM 130 does not host the IP address of the target destination (e.g., the target destination was terminated or moved while the packet was in transit), the GWM 130 may consult a lookup table to determine whether to return to OPERATION 330 to transmit the L3 packet to a different GWM 130, and to send an error message to the source GWM 130, drop the L3 packet, or drop the L3 packet and send an error message to the source GWM 130. In various aspects, when the source GWM 130 receives an error message, it may update its lookup table and associated IP addresses with information provided in the error message from the remote GWM 130 (such as new assignments of GWMs 130 to handle various AM IP addresses 121, DCE transfers, terminations of machines, etc.), and the source GWM 130 may decide whether to forward the error message to the source of the L3 message.

At OPERATION 360 the L3 packet is forwarded to the destination within the destination DCE 110 by the destination GWM 130. The L3 packet will retain in its destination and source fields the IP addresses (or mnemonics) specified at the time of transmission from the source. Method 300 may then conclude.

As will be appreciated, the communication via L3 packets described herein is at least bi-directional. Packets may be sent from a first DCE 110a to be received by a second DCE 110b and from the second DCE 110b to be received by the first DCE 110a, and packets may be sent between multiple DCE 110 comprising a subnet 100, for example via a broadcast to multiple GWM 130. In other aspects where DCE 110a is allowed to user L2 communications, (i.e., is an unrestricted L2 network), GWM 130a is operable to use L2 protocols and mechanisms to associate the GWM 130a with IP addresses in DCE 110b. These L2 protocols and mechanisms include but are not limited to, proxying ARP responses of IP addresses in DCE 110b, transparent Ethernet bridging, and address discovery protocols.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 4:
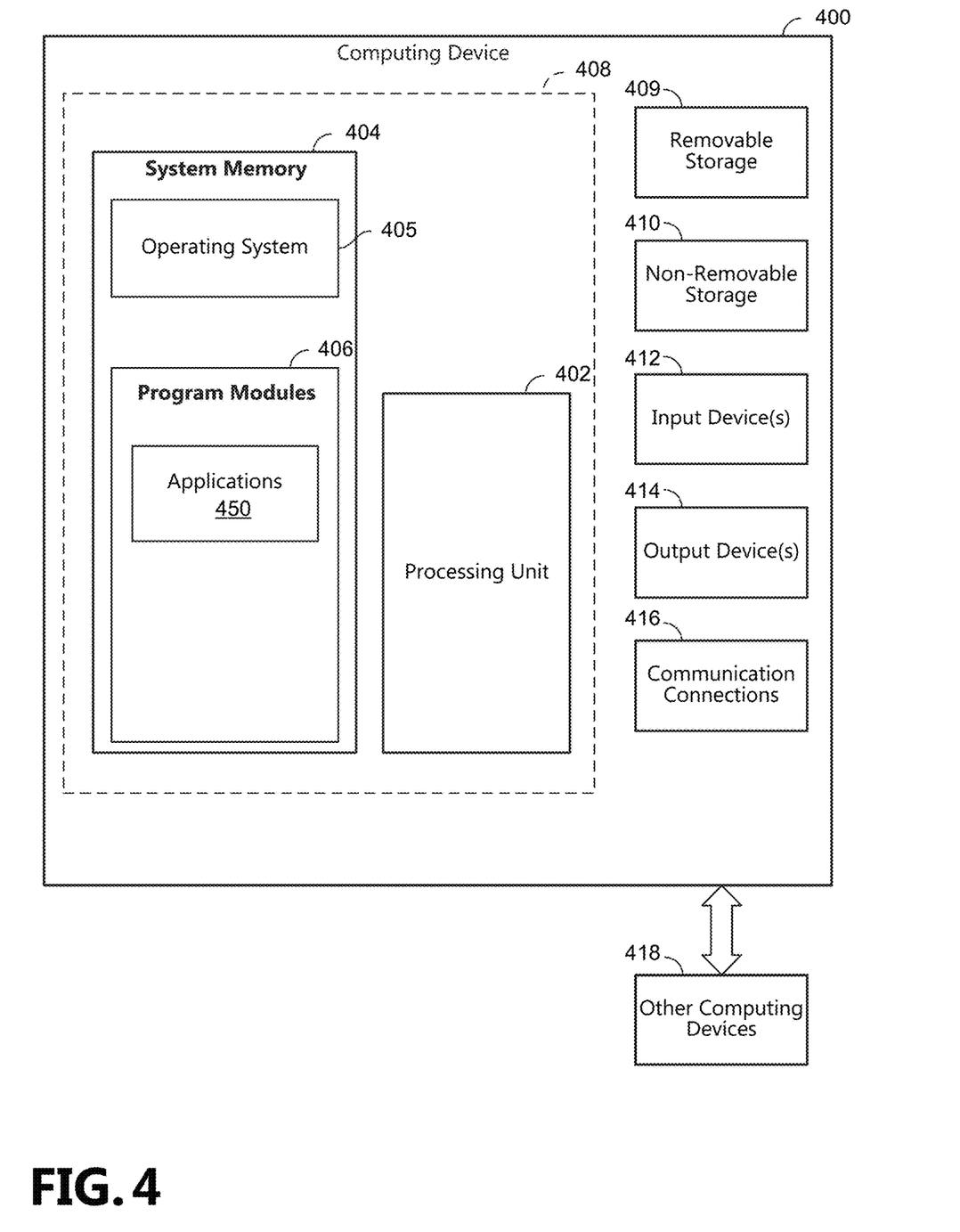
FIG. 4 is a block diagram illustrating physical components of a computing device with which examples may be practiced.

FIG. 4 and the associated description provide a discussion of an example operating environment in which examples are practiced. However, the devices and systems illustrated and discussed with respect to FIG. 4 are for purposes of example and illustration and are not limiting of a vast number of computing device configurations that are utilized for practicing aspects, described herein.

FIG. 4 is a block diagram illustrating physical components (i.e., hardware) of a computing device 400 with which examples of the present disclosure may be practiced. In a basic configuration, the computing device 400 includes at least one processing unit 402 and a system memory 404. According to an aspect, depending on the configuration and type of computing device, the system memory 404 comprises, but is not limited to, volatile storage (e.g., random access memory), non-volatile storage (e.g., read-only memory), flash memory, or any combination of such memories. According to an aspect, the system memory 404 includes an operating system 405 and one or more program modules 406 suitable for running software applications 450. According to an aspect, the system memory 404 includes stored instructions for providing an AM 120, a GWM 130, or enabling a software application 450 to employ the teachings of the present disclosure. The operating system 405, for example, is suitable for controlling the operation of the computing device 400. Furthermore, aspects are practiced in conjunction with a graphics library, other operating systems, or any other application program, and is not limited to any particular application or system. This basic configuration is illustrated in FIG. 4 by those components within a dashed line 408. According to an aspect, the computing device 400 has additional features or functionality. For example, according to an aspect, the computing device 400 includes additional data storage devices (removable and/or non-removable) such as, for example, magnetic disks, optical disks, or tape. Such additional storage is illustrated in FIG. 4 by a removable storage device 409 and a non-removable storage device 410.

As stated above, according to an aspect, a number of program modules and data files are stored in the system memory 404. While executing on the processing unit 402, the program modules 406 perform processes including, but not limited to, one or more of the stages of the methods 200 and 300 illustrated in FIGS. 2 and 3. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, the computing device 400 has one or more input device(s) 412 such as a keyboard, a mouse, a pen, a sound input device, a touch input device, etc. The output device(s) 414 such as a display, speakers, a printer, etc. are also included according to an aspect. The aforementioned devices are examples and others may be used. According to an aspect, the computing device 400 includes one or more communication connections 416 allowing communications with other computing devices 418. Examples of suitable communication connections 416 include, but are not limited to, radio frequency (RF) transmitter, receiver, and/or transceiver circuitry; universal serial bus (USB), parallel, and/or serial ports.

The term computer readable media, as used herein, includes computer storage media apparatuses and articles of manufacture. Computer storage media include volatile and nonvolatile, removable and non-removable media implemented in any method or technology for storage of information, such as computer readable instructions, data structures, or program modules. The system memory 404, the removable storage device 409, and the non-removable storage device 410 are all computer storage media examples (i.e., memory storage). According to an aspect, computer storage media include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. According to an aspect, any such computer storage media is part of the computing device 400. Computer storage media do not include a carrier wave or other propagated data signal.

According to an aspect, communication media are embodied by computer readable instructions, data structures, program modules, or other data in a modulated data signal, such as a carrier wave or other transport mechanism, and include any information delivery media. According to an aspect, the term "modulated data signal" describes a signal that has one or more characteristics set or changed in such a manner as to encode information in the signal. By way of example, and not limitation, communication media include wired media such as a wired network or direct-wired connection, and wireless media such as acoustic, radio frequency (RF), infrared, and other wireless media.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope of the present disclosure.

I claim:

1. A method for enabling subnet stretching between a first networking environment at a second networking environment via Layer 3 (L3) communications, comprising:
configuring a first machine in a first network assigned a first IP address as a first gateway to communicate with a second machine in a second network assigned a second IP address configured to act in the second network as a second gateway, wherein the first IP address and the second IP address share a common network address prefix;
configuring the first network as a part of a single subnet with the second network using a subnet mask shared by networks comprising the single subnet;
receiving, within the first network at the first gateway, an L3 packet having a destination field designating at least one IP address associated with the second gateway;
encapsulating, at the first gateway, the L3 packet as a payload of a tunneled L3 packet, wherein a destination field of the tunneled L3 packet designates the second IP address;
transmitting the tunneled L3 packet from the first gateway to the second gateway;
decapsulating, at the second gateway, the tunneled L3 packet to restore the L3 packet; and
forwarding, from the second gateway, the L3 packet to the at least one IP address in the second network designated in the destination field.

2. The method of claim 1, further comprising mapping IP addresses of machines from the second network to the first gateway within the first network.

3. The method of claim 2, wherein mapping IP addresses of machines from the second network to the first gateway includes assigning an IP address in the second network via IP configuration on the first gateway.

4. The method of claim 3, wherein assigning an IP address assigned in the second network via IP configuration on the first gateway, comprises:
calling, by the first gateway, an address assignment protocol mechanism in the first network requesting the IP address assigned in the second network;
receiving, from the address assignment protocol mechanism in the first network, the IP address assigned in the second network; and
mapping the IP address assigned in the second network to the first gateway in the first network.

5. The method of claim 1, further comprising:
providing a virtual machine in the second network, the virtual machine having a third IP address;
moving the virtual machine to the first network;
associating the third IP address with the second gateway;
unassociating the third IP address from the first gateway; and
retaining the third IP address with the virtual machine.

6. The method of claim 1, further comprising:
enabling a third machine in a third network having a third IP address as a third gateway; wherein the first IP address, the second IP address, and the third IP address share a common network address prefix;
configuring the third network with the first network and the second network as a third part of the single subnet with the shared subnet mask;
discovering IP addresses of virtual machines provided by the third network as part of the subnet;
associating the discovered IP addresses from the third network with the first gateway in the first network and the second gateway in the second network; and
associating the IP addresses from the first network and the IP addresses from the second network with the third gateway in the third network.

7. The method of claim 2, wherein the first network includes a secondary gateway, and further comprising:
designating the first gateway as a primary gateway for the first network;

configuring a third machine in the first network having a third IP address as the secondary gateway;
unassociating a portion of the IP addresses from the second network that are associated with the primary gateway in the first network; and
associating the portion of the IP addresses unassociated from the primary gateway with the secondary gateway.

8. The method of claim 1, wherein at least one of the first network and the second network are a distributed computing environment that use L2-free communications.

9. The method of claim 1, wherein at least one of the first network and the second network is a distributed computing environment that uses L2 communications and L2 protocols.

10. A system for enabling subnet stretching via Layer 3 (L3) communications, comprising:
a first machine in a first network assigned a first IP address as a first gateway to communicate with a second machine in a second network assigned a second IP address configured to act in the second network as a second gateway, wherein the first network is configured as a part of a single subnet with the second network using a subnet mask shared by networks comprising the single subnet, and wherein the first IP address and the second IP address share a common network address prefix;
wherein the system is configured to:
receive, within the first network at the first gateway, an L3 packet having a destination field designating at least one IP address associated with the second gateway;
encapsulate, at the first gateway, the L3 packet as a payload of a tunneled L3 packet, wherein a destination field of the tunneled L3 packet designates the second IP address;
transmit the tunneled L3 packet from the first gateway to the second gateway;
decapsulate, at the second gateway, the tunneled L3 packet to restore the L3 packet; and
forward, from the second gateway, the L3 packet to the at least one IP address in the second network designated in the destination field.

11. The system of claim 10, wherein IP addresses of machines from the second network are mapped to the first gateway within the first network.

12. The system of claim 11, wherein mapping IP addresses of machines from the second network to the first gateway includes assignment of an IP address in the second network via IP configuration on the first gateway.

13. The system of claim 12, wherein assignment of the IP address in the second network via IP configuration on the first gateway comprises:
calling, by the first gateway, an address assignment protocol mechanism in the first network requesting the IP address assigned in the second network;
receiving, from the address assignment protocol mechanism in the first network, the IP address assigned in the second network; and
mapping the IP address assigned in the second network to the first gateway in the first network.

14. The system of claim 10, wherein the first network includes a secondary gateway, wherein the system is further configured to:
designate the first gateway as a primary gateway for the first network;
configure a third machine in the first network having a third IP address as the secondary gateway;

unassociate a portion of the IP addresses from the second network that are associated with the primary gateway in the first network; and associate the portion of the IP addresses unassociated from the primary gateway with the secondary gateway.

15. The system of claim 10, wherein at least one of the first network and the second network are a distributed computing environment that use L2-free communications.

16. The system of claim 10, wherein at least one of the first network and the second network is a distributed computing environment that uses L2 communications and L2 protocols.

17. A method for enabling subnet stretching via Layer 3 (L3) communications, comprising:

configuring a first machine in a first network assigned a first IP address as a first gateway to communicate with a second machine in a second network assigned a second IP address configured to act in the second network as a second gateway, wherein at least one of the first network and the second network are a distributed computing environment that use L2-free communications, and wherein the first IP address and the second IP address share a common network address prefix;

configuring the first network as a part of a single subnet with the second network using a subnet mask shared by networks comprising the single subnet;

receiving, within the first network at the first gateway, an L3 packet having a destination field designating at least one IP address associated with the second gateway;

encapsulating, at the first gateway, the L3 packet as a payload of a tunneled L3 packet, wherein a destination field of the tunneled L3 packet designates the second IP address;

transmitting the tunneled L3 packet from the first gateway to the second gateway;

decapsulating, at the second gateway, the tunneled L3 packet to restore the L3 packet; and forwarding, from the second gateway, the L3 packet to the at least one IP address in the second network designated in the destination field.

18. The method of claim 17, further comprising mapping IP addresses of machines from the second network to the first gateway within the first network, wherein mapping IP addresses of machines from the second network to the first gateway includes assigning an IP address assigned in the second network via IP configuration on the first gateway.

19. The method of claim 18, wherein assigning an IP address assigned in the second network via IP configuration on the first gateway comprises:

calling, by the first gateway, an address assignment protocol mechanism in the first network requesting the IP address assigned in the second network;

receiving, from the address assignment protocol mechanism in the first network, the IP address assigned in the second network; and mapping the IP address assigned in the second network to the first gateway in the first network.

20. The method of claim 17, wherein at least one of the first network and the second network is a distributed computing environment that uses L2 communications and L2 protocols.

* * * * *